US012621174B2

(12) United States Patent
Fluhrer et al.

(10) Patent No.: US 12,621,174 B2
(45) Date of Patent: May 5, 2026

(54) DATA SECURITY FOR NETWORKS COMBINING ENCRYPTION WITH ERROR CORRECTION

(71) Applicant: Cisco Technology, Inc., San Jose, CA (US)

(72) Inventors: Scott Roy Fluhrer, North Attleboro, MA (US); Gilberto Loprieno, Milan (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 188 days.

(21) Appl. No.: 18/454,416

(22) Filed: Aug. 23, 2023

(65) Prior Publication Data

US 2025/0070989 A1 Feb. 27, 2025

(51) Int. Cl.
| | |
|---|---|
| *H04L 9/40* | (2022.01) |
| *G06F 21/80* | (2013.01) |
| *H03M 13/15* | (2006.01) |
| *H04J 3/16* | (2006.01) |
| *H04L 1/22* | (2006.01) |
| *H04L 9/00* | (2022.01) |

(52) U.S. Cl.
CPC ............... *H04L 9/40* (2022.05); *G06F 21/80* (2013.01); *H03M 13/1515* (2013.01); *H04J 3/1611* (2013.01); *H04L 1/22* (2013.01); *H04L 9/007* (2013.01)

(58) Field of Classification Search
CPC ......... H04L 1/22; H04L 1/0057; H04L 1/245; H04L 1/0041; H04L 1/004; H04L 1/02; H04L 9/007; H04L 9/3236; H04L 9/3263; H04L 9/3247; H04J 3/14; H04J 3/1611; H04J 14/02; G06F 21/80
See application file for complete search history.

(56) References Cited

U.S. PATENT DOCUMENTS

| | | | |
|---|---|---|---|
| 7,099,584 B1 * | 8/2006 | Narvaez | H04J 3/1611 398/58 |
| 2005/0068995 A1 | 3/2005 | Lahav et al. | |
| 2008/0065906 A1 * | 3/2008 | Itagaki | G06F 21/80 713/193 |

(Continued)

FOREIGN PATENT DOCUMENTS

WO WO-0161909 A1 * 8/2001 ............... H04L 1/22

OTHER PUBLICATIONS

International Telecommunication Union: "Flexible OTN short-reach interfaces Amendment 3," ITU Publications, Recommendation ITU-T G.709.1/Y.1331.1 (2018) Amd. Nov. 3, 2022, Published in Switzerland, Geneva, 2023, 66 Pages.

(Continued)

*Primary Examiner* — Kyung H Shin
(74) *Attorney, Agent, or Firm* — Edell, Shapiro & Finnan, LLC

(57) ABSTRACT

In one example embodiment, data is received at a node of a network. The data includes encrypted data segments containing data portions and error correction information. The encrypted data segments are decrypted to produce the data portions and the error correction information. Error correction is performed on the data portions using the error correction information. Corrupt data is determined based on the error correction indicating uncorrectable data.

20 Claims, 10 Drawing Sheets

(56) References Cited

U.S. PATENT DOCUMENTS

| | | | |
|---|---|---|---|
| 2008/0211624 A1* | 9/2008 | Micali | H04L 9/007 340/5.6 |
| 2012/0137196 A1 | 5/2012 | Linkewitsch | |
| 2014/0133653 A1 | 5/2014 | Loprieno et al. | |
| 2016/0301669 A1 | 10/2016 | Muma et al. | |
| 2020/0067887 A1 | 2/2020 | Sarwar | |

OTHER PUBLICATIONS

Reed-Solomon Codes, "An Introduction to Reed-Solomon Codes: Principles, Architecture and Implementation," retrieved from https://www.cs.cmu.edu/~guyb/realworld/reedsolomon/reed_solomon_codes.html, on Aug. 9, 2023, 6 pages.
Yu, C., et al., "Two-Mode Reed-Solomon Decoder using Simplified Step-by-Step Algorithm," IEEE Transactions on Circuits and System-II: Express Briefs, vol. 62, No. 11, Jul. 14, 2015, 5 pages.

* cited by examiner

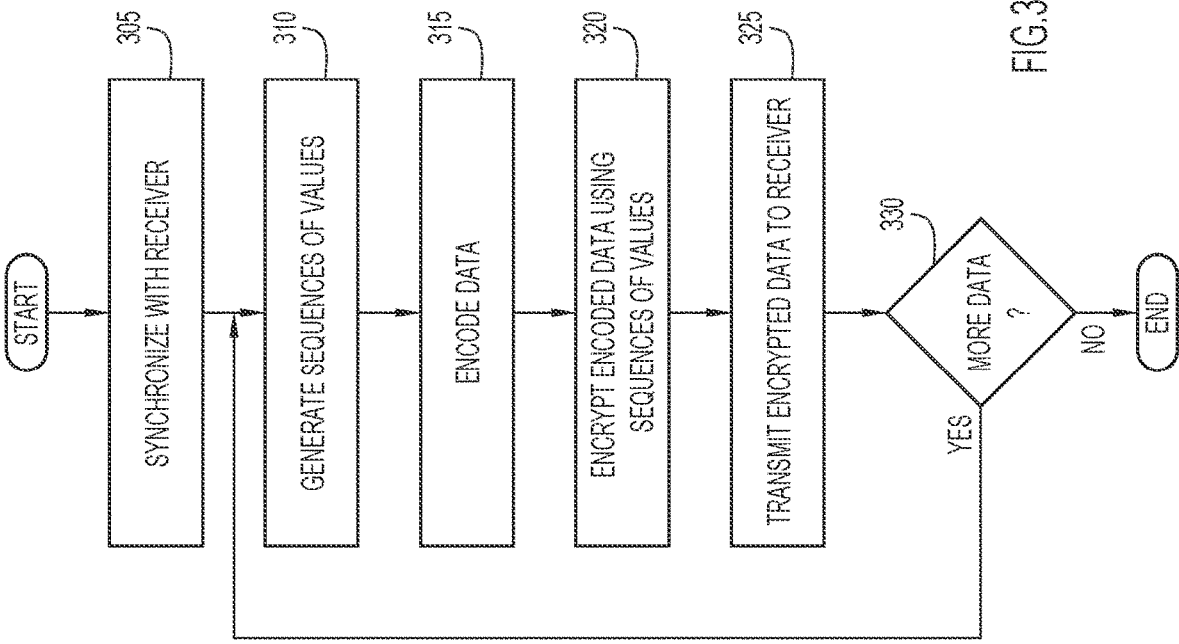
FIG.3

START

505   SYNCHRONIZE WITH TRANSMITTER

510   RECEIVE ENCODED DATA

515   GENERATE SEQUENCES OF VALUES

520   DECRYPT ERROR CORRECTION INFORMATION

525   DECODE ENCODED DATA

530   DECODED ?   NO   YES

535   REJECT FRAME AS UNCORRECTABLE

540   MORE DATA ?   YES   NO

END

500

OVERHEAD (EOH)

| AUTHENTICATION TAG | KEY EXCHANGE COMM CHANNEL | RES | KEY INDEX | CIPHER SUITE TYPE | RES | FRAME NUMBER | RES |
|---|---|---|---|---|---|---|---|

FIG. 7B

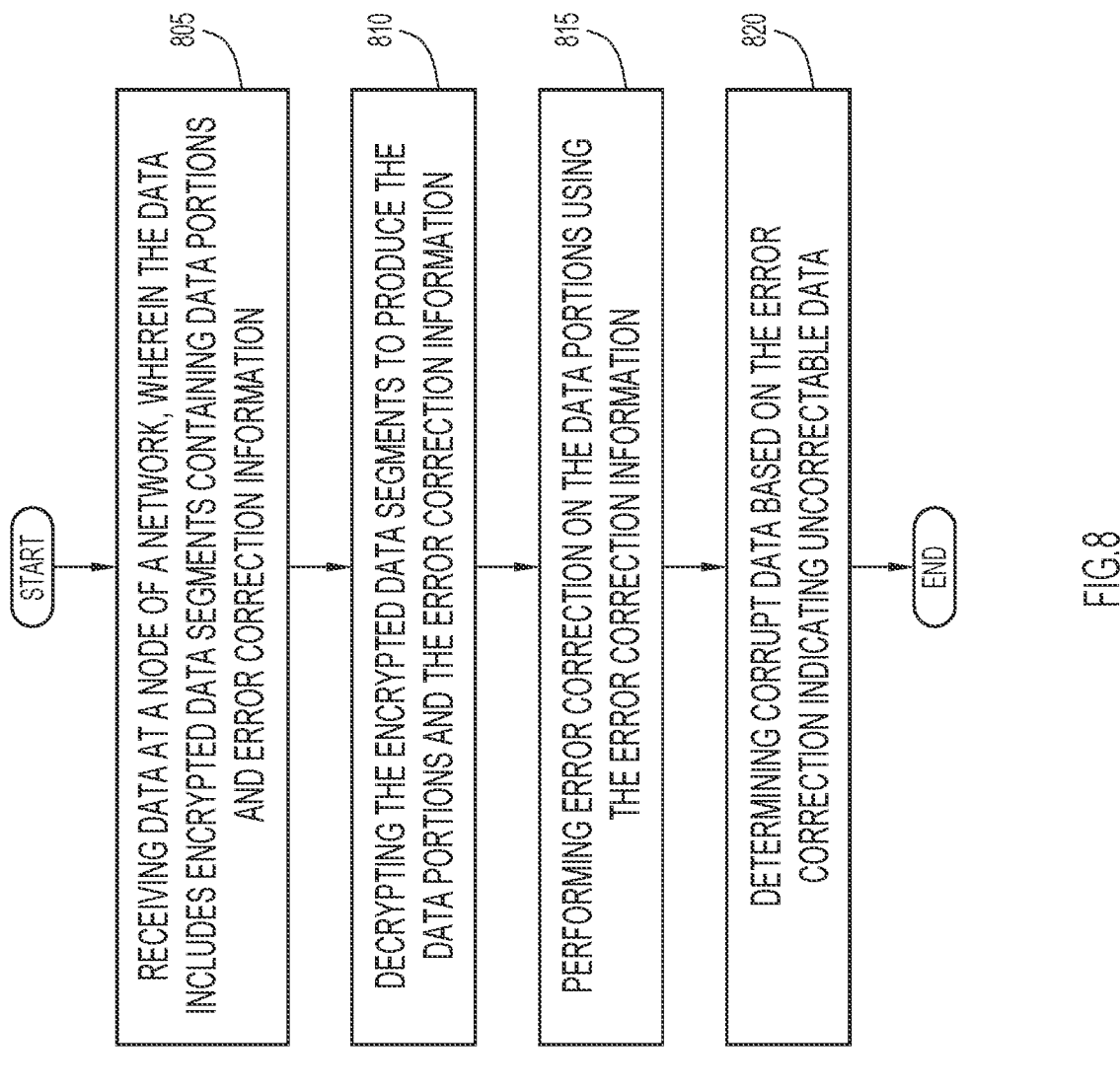

START

RECEIVING DATA AT A NODE OF A NETWORK, WHEREIN THE DATA INCLUDES ENCRYPTED DATA SEGMENTS CONTAINING DATA PORTIONS AND ERROR CORRECTION INFORMATION — 805

DECRYPTING THE ENCRYPTED DATA SEGMENTS TO PRODUCE THE DATA PORTIONS AND THE ERROR CORRECTION INFORMATION — 810

PERFORMING ERROR CORRECTION ON THE DATA PORTIONS USING THE ERROR CORRECTION INFORMATION — 815

DETERMINING CORRUPT DATA BASED ON THE ERROR CORRECTION INDICATING UNCORRECTABLE DATA — 820

END

DATA SECURITY FOR NETWORKS COMBINING ENCRYPTION WITH ERROR CORRECTION

TECHNICAL FIELD

The present disclosure relates to secure data communications.

BACKGROUND

Optical transport network (OTN) frames are encrypted over the network. When a frame has been tampered with, the frame is to be rejected. This can be difficult since detecting tampering resides very late in frame processing logic. In addition, buffering may be required until the frame has been vetted which is costly.

BRIEF DESCRIPTION OF THE DRAWINGS

FIG. 3 is a flowchart of a method for encoding and encrypting data, according to an example embodiment.

FIG. 7B is an illustration of an example block structure for overhead data, according to an example embodiment.

FIG. 8 is a flowchart of a generalized method for combined encryption and error correction, according to an example embodiment.

DETAILED DESCRIPTION

Overview

Figure 1:
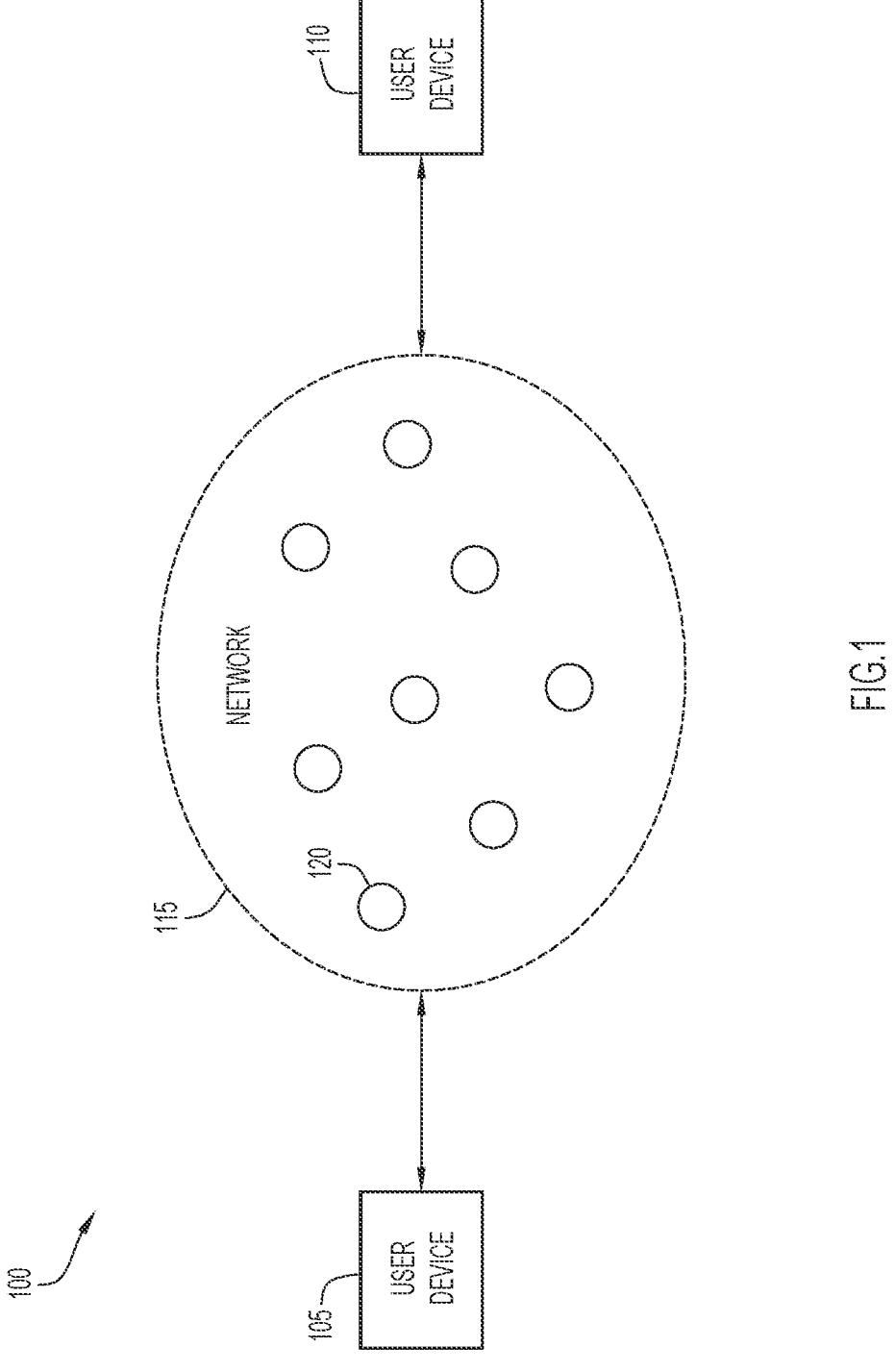
FIG. 1 is a block diagram of an example network environment, according to an example embodiment.

In one example embodiment, data is received at a node of a network. The data includes encrypted data segments containing data portions and error correction information. The encrypted data segments are decrypted to produce the data portions and the error correction information. Error correction is performed on the data portions using the error correction information. Corrupt data is determined based on the error correction indicating uncorrectable data.

Example Embodiments

Random errors on a physical medium are detected and corrected by forward error correction (FEC). If accidental errors (e.g., caused by some line noise, etc.) change some bits, FEC is able to correct them and prevent the effect of the accidental errors. However, FEC is not a secure algorithm.

Since FEC is typically performed by a well known algorithm, a malicious entity can generate a new frame with a new FEC redundancy, and there is no way to detect corrupt FEC data. Further, FEC is a linear code, and a frame may be modified in a way that a modified pattern retains the prior FEC redundancy (e.g., 1234567890 may have an FEC of ABCD, but 1543567890 also has an FEC of ABCD, etc.).

By way of example, optical transport network (OTN) frames are transmitted with a forward error correcting (FEC) field. This field allows a receiver to reconstruct the frame even if several errors are introduced. The receiver uses a Reed-Solomon error correcting code (e.g., RS(544, 514) with 10-bit symbols). A Reed-Solomon code may be expressed as RS(n,k), where k represents a number of symbols (of a specified bit length) in order to generate 2t error correction symbols. In other words, an encoder processes data of k symbols or segments (data portions of a specified bit length) and adds 2t error correction symbols or segments to produce an n symbol codeword. The error correction symbols may be appended to the data to form a codeword with a total length n, where 2t=n–k. A Reed-Solomon decoder corrects up to t erroneous symbols of a codeword. In this case, the Reed-Solomon code, on reception, enables the receiver to recover the original frame (if corruption affected no more than fifteen 10-bit symbols), or (with good probability) replace the entire frame with a fixed error pattern if more than fifteen 10-bit symbols were randomly corrupted.

However, this approach does not protect against intentional attacks. Since the Reed-Solomon algorithm is public, a malicious entity (e.g., individual, software, device, etc.) that makes a change can also compute the forward error correcting (FEC) field and replace the original FEC field contents. In addition, tampered frames are to be rejected. This can be difficult since detecting tampering resides very late in frame processing logic, and may require buffering a frame until the frame has been vetted which is costly.

An example embodiment leverages benefits from forward error correction (FEC) since FEC is able to correct random errors (noise or bit changes), replace uncorrected codeword data with an error message, and store a codeword in a small first-in-first-out (FIFO) buffer. The example embodiment encrypts data so it is not possible to replace frames/packets with data inserted by a malicious entity. Further, data is processed to prevent a malicious entity from manipulating the data. Moreover, the example embodiment does not interfere with error correction properties of FEC (e.g., Reed-Solomon, etc.). For example, erroneous signals at an input of a decoder are the same as those at the output of the decoder. The example embodiment provides no additional latency (since latency is introduced by FEC which is still performed). In addition, no further overhead (e.g., tags, etc.) is added to a frame or packet.

An example embodiment leverages behavior of Reed-Solomon error correction to perform integrity checking (against intentional attacks) without interfering with error correcting properties. A transmitter performs standard optical transport network (OTN) processing (e.g., generating the forward error correction (FEC) field), but before transmission, encrypts each symbol or segment (e.g., 10 bits, etc.). This encryption includes properties that: each symbol in a frame is encoded independently; each plaintext symbol is mapped to an unpredictable ciphertext symbol; and even if a malicious entity knows the original plaintext and ciphertext symbols, the malicious entity who modifies a ciphertext symbol cannot predict a resulting decrypted ciphertext symbol. A receiver decrypts the symbols within the frame as they are received, and performs a Reed-Solomon decoding process (and remaining operations of standard OTN frame processing).

If a malicious entity attempts to modify a frame (e.g., changing 16 or more symbols (e.g., for RS(544,514)), the malicious entity cannot predict decrypted results of those 16 or more symbols. Thus, the malicious entity cannot control decryption of the 16 or more symbols to a valid Reed-Solomon codeword and, with good probability, the Reed-Solomon process rejects the modified frame.

Further, the encryption/decryption process of an example embodiment does not interfere with error correction properties of Reed-Solomon for non-malicious errors. For example, if no more than 15 symbols are corrupted (e.g., for RS(544,514)), the decryption process correctly decrypts all but 15 or fewer symbols and Reed-Solomon corrects the frame.

Moreover, an example embodiment achieves privacy since the encryption process maps the symbols unpredictably. For example, a malicious entity who attempts to modify the frame will successfully make a change to the frame (without triggering the Reed-Solomon error word) with probability at most $2^{-55}$. If this probability is considered to be too high, the probability can be lowered by including a low latency redundant check on the decrypted plaintext (e.g., a checksum, cyclic redundancy check (CRC), etc.).

In addition, with increasing bandwidth being transported over optical links, forward error correction (FEC) is applied to traffic, such as 100/200/400/800 gigabits per second Ethernet (GE) or optical transport network (OTN) frames. However, an FEC codeword is stored, FEC redundancy is calculated and compared with a transported tag, and errors are located and corrected. Resulting data after error correction are processed by secure algorithms (e.g., AES-GCM, etc.) for which packets are stored and authenticated. Packets are decrypted for the authentication, and discharged when the authentication fails. Thus, the overall frame/packet is stored. In contrast, an example embodiment reduces latency since (FEC) memories are re-used without requesting further memories to authenticate and decrypt the traffic. Further, the example embodiment combines encryption and error correction such that these operations are not performed at two different layers (e.g., forward error correction (FEC) and security). Rather, the example embodiment performs FEC correction and security at the same time when FEC is terminated. This avoids latency added by an authentication layer. In other words, security is applied without adding latency.

Example embodiments combining forward error correction (FEC) and integrity may be applicable to various other networks and/or scenarios (e.g., Ethernet traffic, disk encryption which also works with fixed sized sectors and uses FEC, etc.). In addition, example embodiments may be applicable to any type of FEC or any data supporting FEC (e.g., OTN FlexO, etc.).

While the present embodiments are described with respect to optical networks and Reed-Solomon error correction, it will be appreciated that the present embodiments may be applied to various other networks (or network arrangements) and error correction in substantially the same manner described below.

FIG. 1 illustrates a block diagram of an example network environment 100 in which an embodiment presented herein may be implemented. The network environment includes a user device 105 communicating over a network 115 with a user device 110. Network 115 includes a plurality of network nodes 120. Each network node may communicate with one or more other network nodes 120 and/or user devices 105 and/or 110. The network may be any type of network for communicating any type of data (e.g., optical network (e.g., optical transport network (OTN), etc.), Ethernet or other network, etc.). Network nodes 120 may be implemented by, or include, any conventional or other network elements (e.g., routers, gateways, switches, hubs, optics modules, etc.) capable of transmitting data in any medium (e.g., optical signals, electrical signals, electromagnetic signals, etc.). The network may employ any conventional or other protocols, standards, security measures, and/or error correction to transfer data. For example, the network may employ any conventional or other encryption and/or forward error correction (FEC) techniques to transfer data.

Figure 2:
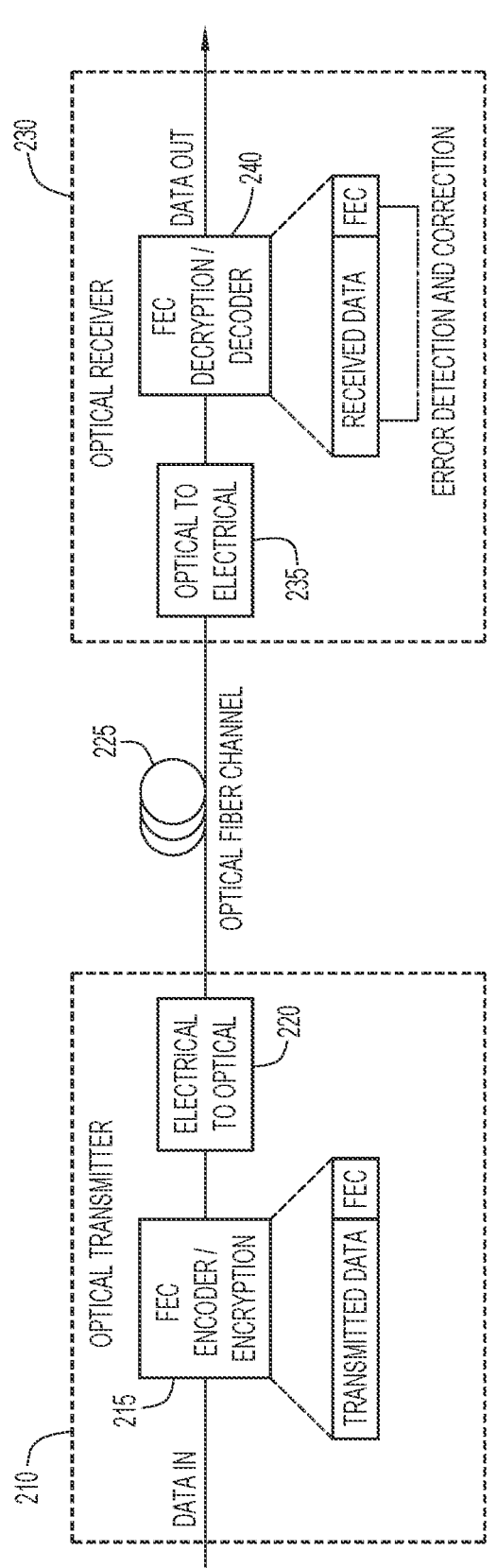
FIG. 2 is a block diagram of network nodes of the network environment of FIG. 1 transferring data, according to an example embodiment.

With continued reference to FIG. 1, FIG. 2 illustrates a block diagram of network nodes of network environment 100 transferring data, according to an example embodiment. By way of example, the network nodes are described with respect to optical networks. However, it will be appreciated that the network nodes may be configured for various other networks (or network arrangements). A transmitting network node 210 communicates over an optical fiber channel 225 with a receiving network node 230. Network nodes 210, 230 may be substantially similar to network nodes 120 described above. Transmitting network node 210 includes a forward error correction (FEC) encoder and encryption module 215 and an electrical to optical converter 220. Data is processed by FEC encoder and encryption module 215 to encode and encrypt data with error correction information according to techniques described herein. The electrical to optical converter converts the encrypted data to optical signals for transmission over optical fiber channel 225 to receiving network node 230.

For example, forward error correction (FEC) encoder and encryption module 215 may employ Reed-Solomon codes. A Reed-Solomon code may be expressed as RS(n,k), where k represents a number of symbols (of a specified bit length) in order to generate 2t error correction symbols. In other words, an encoder processes the data in terms of k symbols or segments (data portions of a specified bit length) and adds 2t error correction symbols or segments to produce an n symbol codeword. The error correction symbols may be appended to the data to form a codeword with a total length n, where $2t=n-k$. A Reed-Solomon decoder corrects up to t erroneous symbols of a codeword. FEC encoder and encryption module 215 may generate Reed-Solomon codewords from the data and encrypt the codewords as described below for transmission to receiving network node 230.

Receiving network node 230 includes an optical to electrical converter 235 and a forward error correction (FEC) decryption and decoder module 240. The encrypted data is received from optical fiber channel 225 and converted to electrical signals by the optical to electrical converter 235. FEC decryption and decoder module 240 decrypts and decodes the encrypted data to authenticate the received data and produce the original data according to techniques described herein. For example, FEC decryption and decoder module 240 may decrypt the data and employ a Reed-Solomon decoder that corrects up to t erroneous symbols of a codeword. An uncorrectable codeword indicates data that is corrupt (e.g., tampered with by a malicious entity, etc.).

Network nodes 210, 230 may be implemented by, or include, any conventional or other network elements (e.g., routers, gateways, switches, hubs, optics modules, etc.) capable of transmitting data in any medium (e.g., optical signals, electrical signals, electromagnetic signals, etc.).

Network nodes 120 may include components of each of network nodes 210, 230 since nodes 120 may transmit and receive data.

Typically, data is stored in a first-in-first-out (FIFO) buffer and errors are identified and corrected by forward error correction (FEC). If errors are not corrected, a codeword is replaced with an error message, and a small FIFO stores the codeword. An integrity check value (ICV) is determined for data stored in the FIFO. When an integrity check value (ICV) calculated from received data matches the ICV (or tag) appended to the received data, the data is authenticated and decryption is enabled. Otherwise, the data is deleted. A large FIFO buffer may store frames/packets (e.g., 10 KBytes for large frames).

In contrast, an example embodiment initially decrypts the data as the data is received (e.g., without a first-in-first-out (FIFO) buffer), where an incorrect symbol is mapped to a random symbol. The decrypted data is stored in a first-in-first-out (FIFO) buffer and errors are identified and corrected by forward error correction (FEC). If errors are not corrected, a codeword is replaced with an error message. A small FIFO buffer may store the codeword (e.g., 5140 bits as described below).

With continued reference to FIGS. 1-2, FIG. 3 illustrates a flowchart of a method 300 for encoding and encrypting data for transmission according to an example embodiment. Initially, a transmitting node (e.g., a network node 120 within network environment 100 transmitting data) synchronizes with a receiving node (e.g., a corresponding network node 120 within network environment 100 receiving the data) at operation 305.

This may be performed in an initialization phase where the transmitting node and receiving node are synchronized. During the initialization phase, forward error correction (FEC) is disabled or enabled in a certain mode (e.g., Reed-Solomon RS(544, 514) with 10-bit symbols and each codeword having 5440 bits with 5140 bits of data and 300 bits for error correction, etc.). The transmitting node and receiving node exchange information (e.g., keys, secrets or secret keys, etc.) for communication and synchronization of sequences of values used for encryption and decryption (e.g., Ai and Bi described below).

After initialization is completed (e.g., after the transmitting node and receiving node complete the exchange of information, etc.), a data frame is produced (e.g., with Reed-Solomon codewords including a payload (or data) and forward error correction (FEC) information) and encrypted as described below. In an embodiment, periodical in-band overhead information is exchanged. The overhead information may include nonce and frame/packet number incremented every frame/packet; an optional in-band communication channel (e.g., keys may be distributed out-band or by a dedicated in-band communication channel); an index of a key in use; and a cipher type indicating which mode is in use. The cipher type may be part of a standard or protocol, and may be modified to have expanded values for example embodiments as described below.

The overhead information (including the cipher type) may be transported in-band and is used to communicate when the combined encryption and error correction technique described herein is enabled.

The initialization phase is preferably requested at a beginning of communication. Updates to keys and sequences of values used for encryption (e.g., Ai and Bi described below) are performed when the combined encryption and error correction technique described herein is enabled. The sequences of values used for encryption (e.g., Ai and Bi described below) evolve based on a frame number (e.g., a counter incrementing for each frame). Since frames are expected in sequence, a frame number of a next frame should be greater than the frame number of a previous frame number received. The next frame number is preferably one more than the most recent frame number (depending on the value of the increment).

After initialization is completed (e.g., after the transmitting node and receiving node complete the exchange of information, etc.), a data frame or block is produced (e.g., with Reed-Solomon codewords including a payload (or data) and forward error correction (FEC) information) and encrypted. This may be accomplished by generating unpredictable sequences of values, Ai and Bi, each in a certain numeric range (e.g., 0-1023, etc.) at operation 310. The sequences may be generated using any conventional or other mathematical or cryptographic technique.

Figure 4:
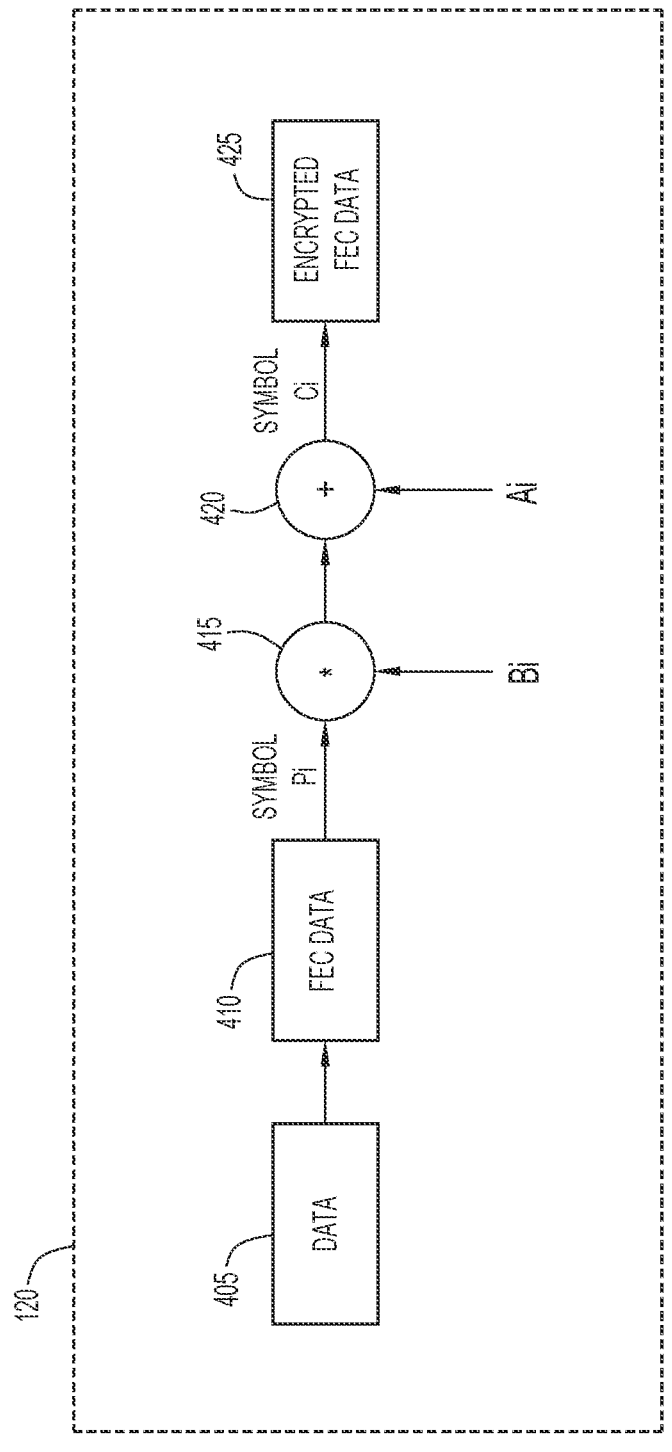
FIG. 4 is a block diagram of a network node of the network environment of FIG. 1 encoding and encrypting data, according to an example embodiment.
Figure 5:
FIG. 5 is a flowchart of a method for decrypting and decoding data, according to an example embodiment.

The data frame is encoded at operation 315, and the encoded data (e.g., data and error correction information) is encrypted at operation 320 using the sequences of values, Ai and Bi. The encoding may use any conventional or other encoding techniques. FIG. 4 illustrates an example of the encoding and encryption. For example, Reed-Solomon encoding may be performed on an original frame or data 405 to generate codeword data 410 (e.g., including the data and forward error correction (FEC) information) in a form of a sequence of symbols, Pi. A Reed-Solomon code may be expressed as RS(n,k), where k represents a number of symbols (of a specified bit length) in order to generate 2t error correction symbols. In other words, an encoder processes the data in terms of k symbols (data portions of a specified bit length) and adds 2t error correction symbols to produce an n symbol codeword. The error correction symbols may be appended to the data to form a codeword with a total length n, where $2t=n-k$. A Reed-Solomon decoder corrects up to t erroneous symbols of a codeword.

Each symbol, Pi, of a codeword (e.g., including data and forward error correction (FEC) information) is encrypted to produce an encrypted symbol, Ci, based on the sequences of values, Ai and Bi. By way of example, $Ci=Pi*Bi+Ai$ (which may be performed within Galois field (GF)(1024) or other numeric range). In other words, the symbol is multiplied by a value from sequence Bi at operation 415 and added to a value from sequence Ai at operation 420. The encrypted symbol, Ci, replaces the corresponding symbol, Pi, in the encoded data to form encrypted codeword data 425. Thus, each symbol of a codeword (e.g., including data and forward error correction (FEC) information) is individually encrypted.

Referring back to FIG. 3, the encrypted data (or codewords) are transmitted to a corresponding receiver at operation 325. The above process repeats from operation 310 until no further data is available for processing as determined at operation 330.

With continued reference to FIGS. 1-4, FIG. 5 illustrates a flowchart of a method 500 for decrypting and decoding received encrypted data according to an example embodiment. Initially, a receiving node (e.g., a corresponding network node 120 within network environment 100 receiving the data) synchronizes with a transmitting node (e.g., a network node 120 within network environment 100 transmitting data) at operation 505 in substantially the same manner described above.

After initialization is completed (e.g., after the receiving node and transmitting node complete the exchange of information, etc.), the receiving node receives an encrypted data frame (e.g., with codewords including data and forward error correction (FEC) information) at operation 510. The frame is processed to simultaneously perform authentication and error correction. This may be accomplished by the receiving node generating the same unpredictable sequences of values, Ai and Bi, used to encrypt the data frame at operation 515 in substantially the same manner described above (operation 310 of FIG. 3). The sequences may be generated using any conventional or other mathematical or cryptographic technique.

The receiving node decrypts the encrypted codewords of the data frame (e.g., including encrypted data and encrypted forward error correction (FEC) information) using the sequences of values, Ai and Bi, at operation 520. This produces the encoded data (e.g., codewords including data and forward error correction (FEC) information). The decrypting may use any conventional or other decryption techniques associated with the encryption. The receiving node decodes the decrypted data (or codewords) at operation 525. For example, Reed-Solomon decoding may be performed for the symbols, Pi, using the FEC information of the decrypted codewords to generate the original data frame.

Figure 6:
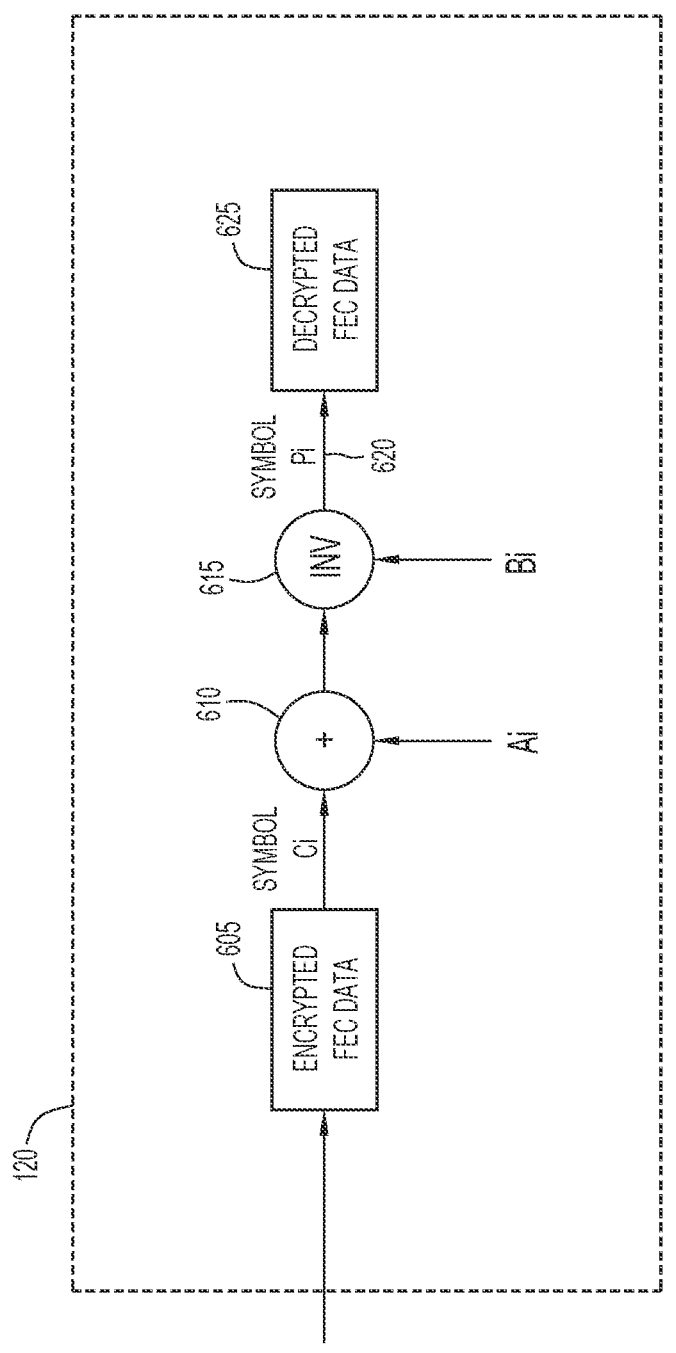
FIG. 6 is a block diagram of a network node of the network environment of FIG. 1 decrypting data, according to an example embodiment.

FIG. 6 illustrates an example of the decryption. By way of example, encrypted data 605 (e.g., including encrypted data and encrypted forward error correction (FEC) information (FEC)) may include encrypted symbols Ci, where Ci=Pi*Bi+Ai (which may be performed within Galois field (GF) (1024) or other numeric range) as described above. Each received symbol, Ci, may be decrypted to produce the original symbol Pi, where Pi=(Ci+Ai)/Bi (which may be performed within Galois field (GF) (1024) or other numeric range).

In other words, a value from sequence Ai is added to the symbol, Ci, at operation 610 and applied to a multiplicative inverse of a value from sequence Bi at operation 615 to produce a decrypted symbol 620, Pi. The decrypted symbol, Pi, replaces the corresponding symbol, Ci, in the data to form decrypted codeword data 625 (e.g., including data and forward error correction (FEC) information). Thus, each symbol of the encrypted codeword (e.g., including data and forward error correction (FEC) information) is individually decrypted.

Referring back to FIG. 5, the receiving node decodes the decrypted codewords (e.g., including data and forward error correction (FEC) information) at operation 525. For example, Reed-Solomon decoding may be performed for the symbols, Pi, of the codewords to generate the original data frame. When the decoding fails (e.g., the data frame is unable to be produced) as determined at operation 530, the receiving node rejects the frame as uncorrectable at operation 535. This indicates that the frame is corrupted and likely tampered with by a malicious entity. The decoding simultaneously performs error correction and authentication since a rejected frame indicates tampered or corrupted data.

The above process repeats from operation 510 until no further data is available for processing as determined at operation 540.

Although a malicious entity can modify any of the encrypted symbols, Ci, there is no control over which symbol, Pi, the symbol Ci corresponds (other than it is not the original). This applies even if the malicious entity knows the original frame symbol. Reed-Solomon corrects the frame to the original values when no more than t symbols are incorrect. If t+1 or more random changes are made, it should translate to an uncorrectable error with good probability. Hence, this provides integrity and privacy without any last message rejection process (since the resident forward error correction (FEC) process is utilized) and without costing any frame bytes that were not already used. The process does not interfere with the FEC properties of the original optical transport (OTN) or other network system. For example, an error that modifies an encrypted symbol, Ci, modifies a corresponding original symbol, Pi. However, if no more than t of these symbols are modified, the decoding process still corrects the error.

The encryption of the error correction information of an example embodiment has various properties. The properties may include that the encryption is invertible, the encryption maps each symbol independently (e.g., a value of a specific plaintext/ciphertext symbol does not affect how other plaintext/ciphertexts are transformed, etc.), knowledge of how some symbols are transformed provides no information with respect to how other symbols are transformed, the value of a ciphertext symbol gives no information about the plaintext symbol without knowledge of the key, and/or knowledge of the plaintext and ciphertext symbols give no information how a different ciphertext symbol would be decrypted without knowledge of the key (other than it would necessarily be different from the original plaintext symbols).

An encryption or transformation of an example embodiment that includes one or more of the above properties is described. By way of example, the transformation is described with respect to optical transport network (OTN) parameters that include a 10-bit symbol size. However, symbols of any size may be used.

Initially, a secret key, k, and a frame number (FN) are provided. Symbols 4i, 4i+1, 4i+2, and 4i+3 are transformed by computing a 128-bit encrypted value, D. Thus, this example processes four symbols at a time. This encrypted value may be determined from the advanced encryption standard (AES), where D=AES(k, 65536*FN+i). The encrypted value is partitioned into 32-bit values, D(s), corresponding to the symbols, D(4i), D(4i+1), D(4i+2), D(4i+3). For each 32-bit value, D(s), a(s) is set to the first 10 bits of D(s) and b(s) is set to the second 10 bits of D(s) plus the third 10 bits of D(s) modulo 1023. If the first 9 bits of b(s) are all 0, set b(s)=1. This generates the unpredictable sequence of values, where a(s) corresponds to Ai and b(s) corresponds to Bi.

The plaintext symbol, P(s), is encrypted by computing a ciphertext symbol, C(s), based on the sequences of values in substantially the same manner described above, where C(s)=(P(s)*b(s))+a(s), and * is multiplication (for Galois field (GF)(1024)) and + is an exclusive or operation (or addition in Galois field (GF)(1024)). The ciphertext symbols, C(s), are decrypted to the corresponding plaintext symbols, P(s), based on the sequences of values in substantially the same manner described above, where P(s)=(C(s)+a(s))*Inv(b(s)) and Inv(x) is the multiplicative inverse of x in Galois Field (GF)(1024). In certain instances, some symbols within a frame are to be readable (e.g., unencrypted). For those symbols, fixed values for the sequences may be used (e.g., a(s)=0, and b(s)=1) to maintain the plaintext symbol.

The example transformation contains the above described properties. For example, the transformation is invertible since b(s) is never zero, and the symbols are encrypted independently. Further, knowledge of how some symbols are transformed give no information about others due to the indistinguishability of advanced encryption standard (AES) from randomness (e.g., the a(s), b(s) values for one symbol are determined from a different section of an AES code book than other symbols). Moreover, the value of a ciphertext symbol gives no information about the plaintext symbol (since b(s) is indistinguishable from random, b(s)+x gives no information about x).

In addition, the value of one plaintext/ciphertext mapping gives no information about another mapping. For example, known plaintext/ciphertexts may be P, C, and a malicious entity may know that P=(a(s)+C)*Inv(b(s)). A different ciphertext, C', would decrypt as:

$$(a(s)+C')*Inv(b(s))=(a(s)+C+(C'-C))*Inv(b(s))=P(i)+(C'-C)*Inv(b(s)).$$

Since b(s) is (close to) evenly distributed in the range [1, 1023], Inv(b(s)) is similarly distributed as well. A change provided by the malicious entity, (C'–C) is a nonzero value. Thus, (C'–C)*Inv(b(s)) is also evenly distributed in the range [1, 1023], and hence P' is evenly distributed over the range (0, 1023).

The combined encryption and error correction of example embodiments described herein is applicable to any connection where forward error correction (FEC) is used. An example embodiment may pertain to optical transport network (OTN) links since ITU-G.709.1 already defines a protocol (Security over FlexO (FlexOsec)) to support security at an OTN layer. ITU-G.709.1 standardizes the security over an OTN, and defines FlexOsec where dedicated overhead bytes are identified for exchanging and synchronizing keys. FlexOsec is based on AES-256-GCM (same algorithm used for Media Access Control security (MACsec)).

The combined encryption and error correction of example embodiments can reuse the overhead and software infrastructure already defined for FlexOsec to exchange information for synchronization of the transmitting node and receiving node. The combined encryption and error correction can be supported by an optical transport network (OTN) application (beyond 100 gigabits per second) based on FlexO since the International Telecommunication Union (ITU) already defined a protocol to support security (FlexOsecOverhead). This same overhead can be used to synchronize the transmitting node and receiving node to enable the combined encryption and error correction described herein.

Figure 7A:
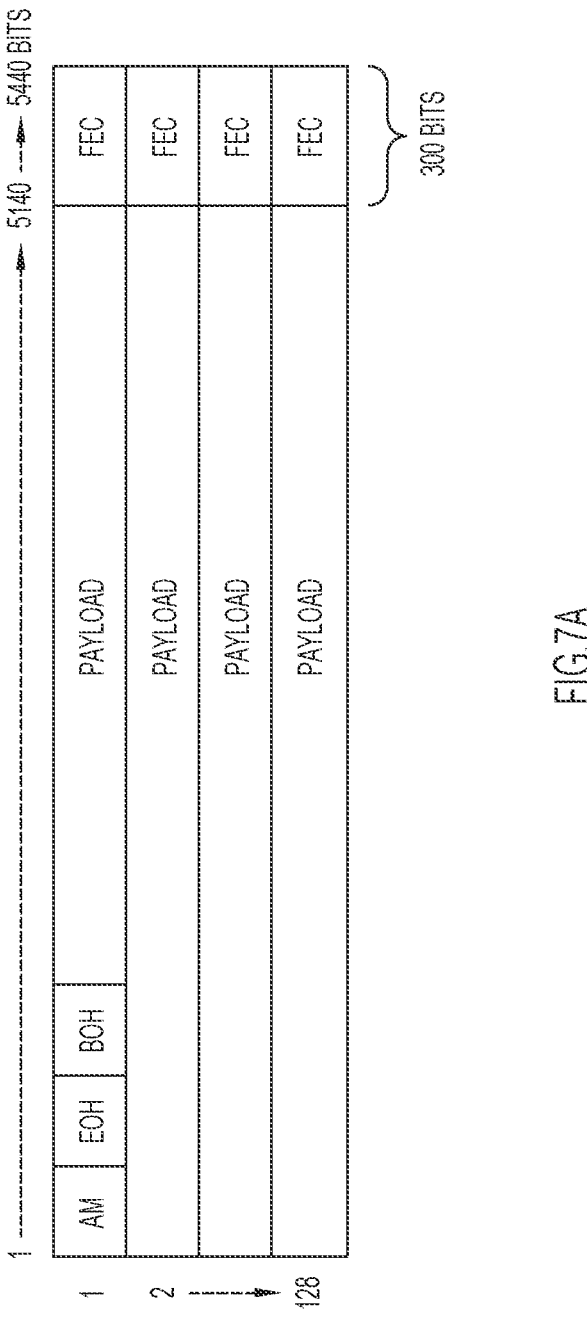
FIG. 7A is an illustration of an example frame structure, according to an example embodiment.

The combined encryption and error correction described herein can be applied to an optical transport network (OTN) since ITU-G.709.1 already defines a protocol to support security (FlexO and FlexOsec) as described above. FlexO supports forward error correction (FEC) and has already defined a dedicated overhead (FlexOsec) to support security for OTN. FIG. 7A illustrates an example frame structure for FlexO. The frame structure includes 128 rows by 5,140 columns (1-bit). The initial row includes a frame alignment marker group area (AM), an extended overhead area (EOH), and a basic overhead area (BOH). The remainder of the frame includes a payload area. The forward error correction (FEC) is based on a Reed-Solomon code, where the symbol size is 10 bits. A codeword occupies one row of the frame. A Reed-Solomon code may be expressed as RS(n,k), where k represents a number of symbols in order to generate 2t error correction symbols. The error correction symbols are appended to a message of total length n, where n=k+2t. By way of example, n=544, k=514, and t=15, resulting in 5140 data bits in the codeword and 300 bits of error correction in each row.

Figure 7B:
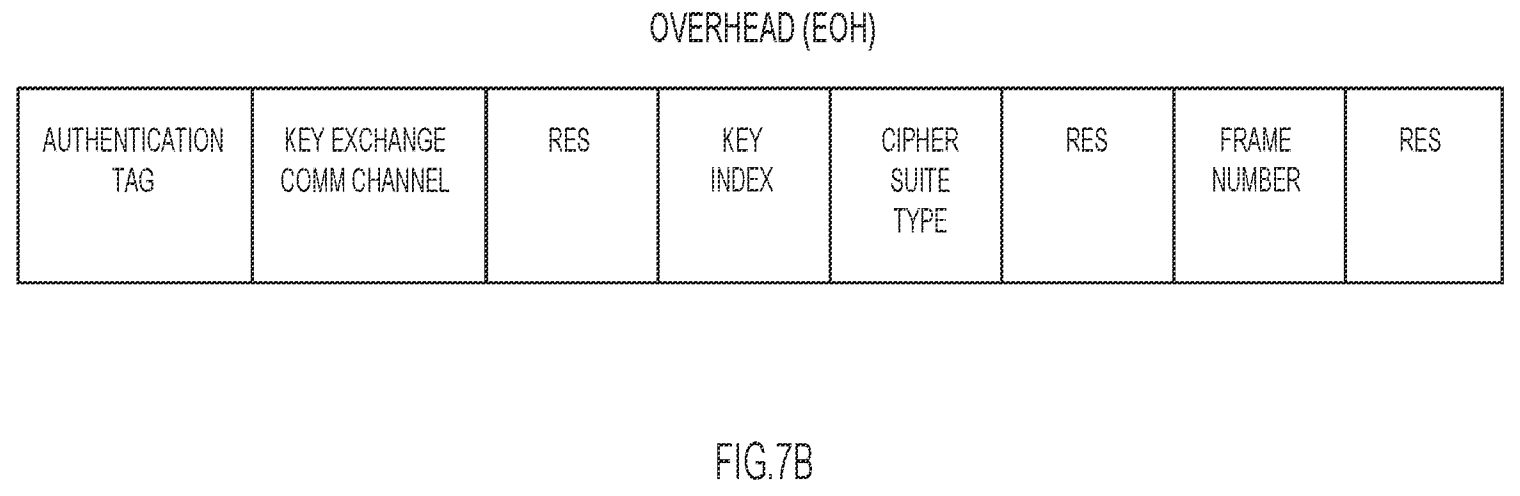

The overhead provides secure communications between two interfaces that are interconnected by various media and systems (e.g., unsecured fibre, a point-to-point optical line system, an optical network, etc.). An authenticated and authorized entity within each interface transforms an unsecured transmission to provide a secured transmission to a client. FIG. 7B illustrates example overhead. For example, ITU-T G.709.1 FlexO defines the overhead to include an authentication tag (e.g., a 128-bit (16 byte) field to maintain integrity of a frame), a key exchange communication channel (e.g., an optional 8-bit (1 byte) field to exchange key agreement protocols in-band), a key index (a 2-bit key index field for an in-band mechanism to coordinate use of keys on both ends), a cipher suite type (CST) (e.g., a 6-bit field to identify and distinguish different types of ciphers (including absence of cipher), profiles or applications), a frame number (e.g., a 64-bit (8 byte) field to synchronize counters on both ends of a connection), and reserved fields (e.g., RES as viewed in FIG. 7B).

The combined encryption and error correction described herein can reuse the same overhead (FlexOSec) and software protocol already defined for operation. In addition, any devices supporting FlexO and FlexOsec can be adapted to support the combined encryption and error correction by reusing the overhead in substantially the same manner described above. For example, the key exchange communication channel can be used to distribute the keys used to generate the sequence of values, Ai and Bi, between transmitting and receiving nodes. The cipher suite type (CST) may be modified to have expanded values for example embodiments. By way of example, a cipher suite type (CST) value of "010xxx" may indicate an initialization phase where standard forward error correction (FEC) is disabled (payload is transported as plaintext) and an example embodiment is synchronizing the sequences of values used for encryption (e.g., Ai and Bi described below). A cipher suite type (CST) value of "011xxx" may indicate an initialization phase where standard FEC is enabled (to correct errors, but payload is not encrypted and authenticated) and an example embodiment is synchronizing the sequences of values used for encryption (e.g., Ai and Bi described above). A cipher suite type (CST) value of "100xxx" may indicate the combined encryption and error correction of an example embodiment is enabled and authenticated (e.g., the sequences of values used for encryption (e.g., Ai and Bi described above) are distributed and synchronized). However, the cipher suite type may be any value indicating any status of example embodiments.

The combined encryption and error correction described herein may further be applied to IEEE 802.3 Ethernet traffic. Since Ethernet does not have a dedicated overhead, a small overhead is requested to be periodically transported. For example, this may be accomplished by modifying alignment markers (AMs). Generally, in order to accommodate higher data rates, the data is distributed among parallel lanes (or path coding sublayer (PCS) lanes). The alignment markers (AMs) include a unique portion for each lane and are inserted periodically to allow a receiver to lock and reassemble multiple lanes. By way of example, 400 gigabits per second Ethernet (GE) alignment markers (AMs) may be inserted periodically (e.g., every 102,0773 microseconds (µs) per IEEE 802.3bs). There is a portion that is common across all alignment markers, a unique portion per PCS lane, and a unique pad (UP) per PCS lane. A receiver searches for common markers and realigns the lanes based on unique portions.

Since the unique pad (UP) within the alignment markers and a pseudo-random binary sequence (PRBS) at the end of the alignment marker group are ignored on receive, unique pads (UP0, UP1, and UP2) may be replaced with information for the combined encryption and error detection described herein to exchange information for synchronization of the transmitting node and receiving node (e.g., information similar to the FlexO overhead described above) for 400 gigabits per second Ethernet (GE). The information is scrambled before insertion in order to balance a number of zeroes and ones transmitted. For 400GE, UP0, UP1, UP2 are 16×3 bytes inserted every 102,0773 μs. Each unique pad (UP) is a communication channel with a bandwidth of 1.2 Mbit/s, and may provide information (e.g., frame number, key index, cipher suite type, key exchange communication channel, etc.) for the combined encryption and error correction described herein to exchange information for synchronization of the transmitting node and receiving node. By way of example, UP0 may contain a frame number (e.g., a 64-bit (8 byte) field to synchronize the counters on both ends), UP1 may contain a key index (e.g., a 2-bit field for an in-band mechanism to coordinate use of keys on both ends) and a cipher suite type (CST) (e.g., a 6-bit field is provided to identify and distinguish different types of ciphers (including absence of cipher), profiles or applications), and UP2 may contain a key exchange communication channel (e.g., an optional 8-bit (1 byte) field to exchange key agreement protocols in-band). This may further be used with 200/400/800GE since these have the same alignment marker structure. However, 100GE has a different structure, and may involve a similar customization with slight adjustments for the different structure.

FIG. 8 is a flowchart of an example method 800 for combined encryption and error correction. At operation 805, data is received at a node of a network. The data includes encrypted data segments containing data portions and error correction information. At operation 810, the encrypted data segments are decrypted to produce the data portions and the error correction information. At operation 815, error correction is performed on the data portions using the error correction information. At operation 820, corrupt data is determined based on the error correction indicating uncorrectable data.

Figure 9:
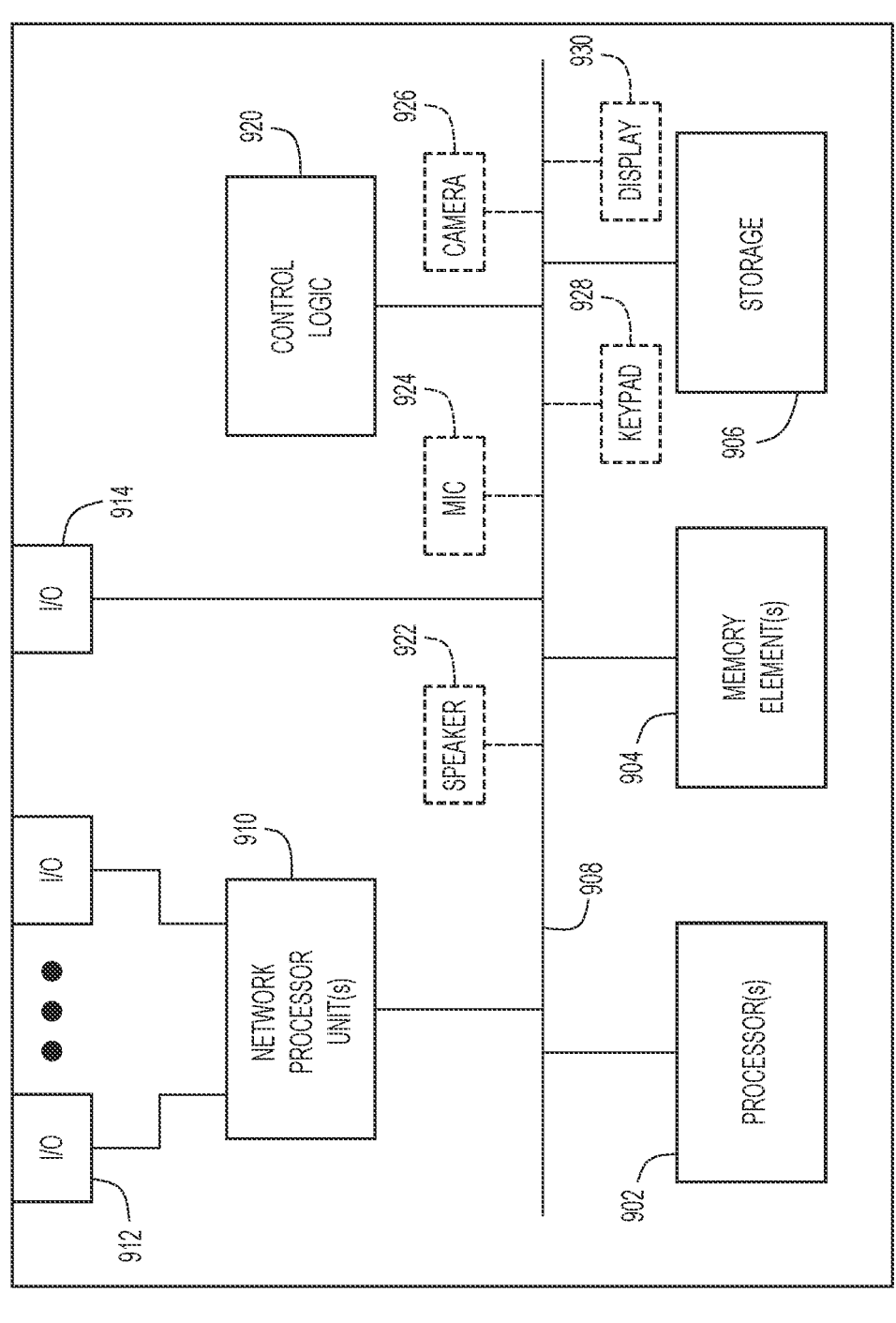
FIG. 9 illustrates a hardware block diagram of a computing device configured to perform functions associated with combined encryption and error correction as discussed herein, according to an example embodiment.

Referring to FIG. 9, FIG. 9 illustrates a hardware block diagram of a computing device 900 that may perform functions associated with operations discussed herein in connection with the techniques depicted in FIGS. 1-8. In various embodiments, a computing device or apparatus, such as computing device 900 or any combination of computing devices 900, may be configured as any device entity/ entities (e.g., computer devices, network computing device (e.g., router, network node, etc.), user device, etc.) as discussed for the techniques depicted in connection with FIGS. 1-8 in order to perform operations of the various techniques discussed herein.

In at least one embodiment, computing device 900 may be any apparatus that may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory elements 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/ modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interfaces 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, network computing device, user device, etc.), computing device 900 may further include, or be coupled to, an audio speaker 922 to convey sound, microphone or other sound sensing device 924, camera or image capture device 926, a keypad or keyboard 928 to enter information (e.g., alphanumeric information, etc.), and/or a touch screen or other display 930. These items may be coupled to bus 908 or I/O interface(s) 914 to transfer data with other elements of computing device 900.

In various embodiments, control logic 920 can include instructions that, when executed, cause processor(s) 902 to perform operations, which can include, but not be limited to, providing overall control operations of computing device 900; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, standalone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory elements 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: receiving data at a node of a network, wherein the data includes encrypted data segments containing data portions and error correction information; decrypting the encrypted data segments to produce the data portions and the error correction information; performing error correction on the data portions using the error correction information; and determining corrupt data based on the error correction indicating uncorrectable data.

In one example, the network includes an optical transport network (OTN) and the data includes an OTN frame.

In one example, the data includes Ethernet traffic.

In one example, the encrypted data segments include Reed-Solomon codes.

In one example, the encrypted data segments are individually encrypted.

In one example, the method further comprises synchronizing unpredictable sequences of values with a transmitting node of the network.

In one example, the encrypted data segments are produced by combining the data portions and the error correction information with the unpredictable sequences of values, and decrypting the encrypted data segments comprises decrypting the encrypted data segments based on the unpredictable sequences of values synchronized with the transmitting node.

In another form, an apparatus is provided. The apparatus comprises: a network computing device of a network comprising one or more processors configured to: receive data including encrypted data segments containing data portions and error correction information; decrypt the encrypted data segments to produce the data portions and the error correction information; perform error correction on the data portions using the error correction information; and determine corrupt data based on the error correction indicating uncorrectable data.

In another form, one or more non-transitory computer readable storage media are provided. The non-transitory computer readable storage media are encoded with processing instructions that, when executed by one or more processors, cause the one or more processors to: receive data at a node of a network, wherein the data includes encrypted data segments containing data portions and error correction information; decrypt the encrypted data segments to produce the data portions and the error correction information; perform error correction on the data portions using the error correction information; and determine corrupt data based on the error correction indicating uncorrectable data.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
receiving data of a frame at a node of a network, wherein the data includes encrypted codewords generated by encrypting codewords including encoded data segments, wherein the encoded data segments include plaintext symbols representing data portions and error correction information, wherein each plaintext symbol of the encoded data segments is associated with a different portion of unpredictable sequences of values and independently encrypted within the encrypted codewords by corresponding values from the different portion to map each plaintext symbol to a corresponding unpredictable ciphertext symbol, and wherein the unpredictable sequences of values are produced from different portions of an encrypted value;

generating the unpredictable sequences of values used to encrypt the codewords;

decrypting the encrypted codewords of the frame using the unpredictable sequences of values to produce the encoded data segments containing the data portions and the error correction information;

performing authentication and error correction simultaneously on the data portions using the error correction information; and determining corrupt data based on the error correction indicating uncorrectable data.

2. The method of claim 1, wherein the network includes an optical transport network (OTN) and the frame includes an OTN frame.

3. The method of claim 1, wherein the data includes Ethernet traffic.

4. The method of claim 1, wherein the encrypted codewords include Reed-Solomon codes.

5. The method of claim 1, wherein the encrypted value is produced based on an advanced encryption standard (AES).

6. The method of claim 1, further comprising:

synchronizing the unpredictable sequences of values with a transmitting node of the network.

7. The method of claim 6, wherein decrypting the encrypted codewords comprises:

decrypting the encrypted codewords based on the unpredictable sequences of values synchronized with the transmitting node.

8. An apparatus comprising:

a network computing device of a network comprising a memory for storing program instructions and one or more processors configured to execute the program instructions and perform operations including:

receiving data of a frame including encrypted codewords generated by encrypting codewords including encoded data segments, wherein the encoded data segments include plaintext symbols representing data portions and error correction information, wherein each plaintext symbol of the encoded data segments is associated with a different portion of unpredictable sequences of values and independently individually encrypted within the encrypted codewords by corresponding values from the different portion to map each plaintext symbol to a corresponding unpredictable ciphertext symbol, and wherein the unpredictable sequences of values are produced from different portions of an encrypted value;

generating the unpredictable sequences of values used to encrypt the codewords;

decrypting the encrypted codewords of the frame using the unpredictable sequences of values to produce the encoded data segments containing the data portions and the error correction information;

performing authentication and error correction simultaneously on the data portions using the error correction information; and determining corrupt data based on the error correction indicating uncorrectable data.

9. The apparatus of claim 8, wherein the network includes an optical transport network (OTN) and the frame includes an OTN frame.

10. The apparatus of claim 8, wherein the data includes Ethernet traffic.

11. The apparatus of claim 8, wherein the encrypted codewords include Reed-Solomon codes.

12. The apparatus of claim 8, wherein the encrypted value is produced based on an advanced encryption standard (AES).

13. The apparatus of claim 8, wherein the one or more processors are configured to perform further operations including:

synchronizing the unpredictable sequences of values with a transmitting node of the network, and wherein decrypting the encrypted codewords comprises decrypting the encrypted codewords based on the unpredictable sequences of values synchronized with the transmitting node.

14. One or more non-transitory computer readable storage media encoded with processing instructions that, when executed by one or more processors, cause the one or more processors to perform operations including:

receiving data of a frame at a node of a network, wherein the data includes encrypted codewords generated by encrypting codewords including encoded data segments, wherein the encoded data segments include plaintext symbols representing data portions and error correction information, wherein each plaintext symbol of the encoded data segments is associated with a different portion of unpredictable sequences of values and independently encrypted within the encrypted codewords by corresponding values from the different portion to map each plaintext symbol to a corresponding unpredictable ciphertext symbol, and wherein the unpredictable sequences of values are produced from different portions of an encrypted value;

generating the unpredictable sequences of values used to encrypt the codewords;

decrypting the encrypted codewords of the frame using the unpredictable sequences of values to produce the encoded data segments containing the data portions and the error correction information;

performing authentication and error correction simultaneously on the data portions using the error correction information; and determining corrupt data based on the error correction indicating uncorrectable data.

15. The one or more non-transitory computer readable storage media of claim 14, wherein the network includes an optical transport network (OTN) and the frame includes an OTN frame.

16. The one or more non-transitory computer readable storage media of claim 14, wherein the data includes Ethernet traffic.

17. The one or more non-transitory computer readable storage media of claim 14, wherein the encrypted codewords include Reed-Solomon codes.

18. The one or more non-transitory computer readable storage media of claim 14, wherein the encrypted value is produced based on an advanced encryption standard (AES).

19. The one or more non-transitory computer readable storage media of claim 14, wherein the processing instructions cause the one or more processors to perform further operations including:

synchronizing the unpredictable sequences of values with a transmitting node of the network.

20. The one or more non-transitory computer readable storage media of claim 19, wherein decrypting the encrypted codewords comprises:

decrypting the encrypted codewords based on the unpredictable sequences of values synchronized with the transmitting node.

* * * * *